United States Patent
Tucker et al.

(10) Patent No.: US 9,525,457 B1
(45) Date of Patent: Dec. 20, 2016

(54) SPREAD SPECTRUM CLOCK GENERATION USING A TAPPED DELAY LINE AND ENTROPY INJECTION

(71) Applicant: Honeywell International Inc., Morristown, NJ (US)

(72) Inventors: James L. Tucker, Clearwater, FL (US); Thomas Cordella, Tampa, FL (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/789,824

(22) Filed: Jul. 1, 2015

(51) Int. Cl.
*H04B 1/7183* (2011.01)
*H04B 1/7075* (2011.01)
*H04B 1/69* (2011.01)

(52) U.S. Cl.
CPC ......... *H04B 1/7183* (2013.01); *H04B 1/7075* (2013.01); *H04B 2001/6908* (2013.01)

(58) Field of Classification Search
USPC ........ 375/138, 130, 376, 139, 135; 327/164, 327/141, 145
See application file for complete search history.

(56) References Cited

U.S. PATENT DOCUMENTS

| | | | |
|---|---|---|---|
| 5,355,389 A | 10/1994 | O'Clock et al. | |
| 5,488,627 A * | 1/1996 | Hardin | H03B 29/00 375/139 |
| 6,294,936 B1 | 9/2001 | Clementi | |
| 6,462,705 B1 | 10/2002 | McEwan | |
| 6,597,226 B1 | 7/2003 | Eade et al. | |
| 6,643,317 B1 | 11/2003 | Blumer | |
| 6,658,043 B2 | 12/2003 | Hardin et al. | |
| 7,061,293 B2 | 6/2006 | Fukushima | |
| 7,167,059 B2 | 1/2007 | Abraham et al. | |
| 7,221,704 B2 | 5/2007 | Greenberg | |
| 7,817,747 B2 | 10/2010 | Waheed et al. | |
| 7,944,319 B2 | 5/2011 | Kerr et al. | |
| 8,023,553 B2 | 9/2011 | Ko et al. | |
| 8,320,428 B1 | 11/2012 | Hattori | |
| 8,799,700 B2 | 8/2014 | Arumugham et al. | |
| 9,191,128 B2 * | 11/2015 | Shiao | H03L 7/197 |
| 2003/0039330 A1 * | 2/2003 | Castiglione | H03L 7/197 375/376 |
| 2005/0008113 A1 * | 1/2005 | Kokubo | G06F 1/04 375/376 |
| 2007/0194817 A1 * | 8/2007 | Decker | H03K 3/84 327/141 |

(Continued)

OTHER PUBLICATIONS

Cheng, "Programmable Spread Spectrum Clock Generator," National Chiao Tung University, Department of Electrical and Control Engineering, Thesis, Jan. 2008, 70 pp.

(Continued)

*Primary Examiner* — Eva Puente
(74) *Attorney, Agent, or Firm* — Shumaker & Sieffert, P.A.

(57) ABSTRACT

Spread spectrum clocking circuitry may be configured to produce a spread spectrum clock signal that coordinates the actions of functional circuitry. Spread spectrum clocking circuitry may be configured to include delay circuitry configured to generate a random delay signal based on a random input value and generate the spread spectrum clock signal based on the random delay signal. By introducing true randomness into the delay signal, spread spectrum clocking signal may be able to generate a truly random, as opposed to a merely pseudo random, clock signal.

18 Claims, 4 Drawing Sheets

(56) References Cited

U.S. PATENT DOCUMENTS

| | | | | |
|---|---|---|---|---|
| 2008/0231331 A1* | 9/2008 | Balraj | ...................... | G06F 1/04 327/145 |
| 2009/0135885 A1* | 5/2009 | Lin | ........................ | H04B 1/69 375/130 |
| 2010/0176852 A1* | 7/2010 | Lin | ..................... | H03D 13/004 327/155 |
| 2012/0327974 A1* | 12/2012 | Kim | .................... | H03C 3/0916 375/135 |
| 2014/0032623 A1* | 1/2014 | Lablans | ................... | G06F 7/58 708/252 |
| 2014/0317419 A1* | 10/2014 | Cooke | ................ | G06F 12/1408 713/193 |
| 2015/0263709 A1* | 9/2015 | Luedeke | ................. | H03K 3/84 327/164 |

OTHER PUBLICATIONS

Sadamura et al., "Spread-Spectrum Clocking in Switching Regulators to Reduce EMI," Proceedings of the 2002 IEEE Asia-Pacific Conference on ASIC, 2002, pp. 141-144.

* cited by examiner

US 9,525,457 B1

SPREAD SPECTRUM CLOCK GENERATION USING A TAPPED DELAY LINE AND ENTROPY INJECTION

TECHNICAL FIELD

The disclosure relates to systems and methods for generating spread spectrum clock signals.

BACKGROUND

Synchronous digital electronic devices are equipped with one or more oscillators that produce continuous clock signals at set frequencies. Within these electronic devices, transitions of logic levels occur simultaneous and coincident to a clock edge. Contemporary designs often have large clock trees, and many designs utilize clock sources that are in the RF frequency range, emanating significant electromagnetic (EM) radiation into the surrounding area. When the power of the EM signal crosses a certain threshold, the EM signal can electronically interfere with devices in close proximity. To mitigate this risk, the Federal Communication Commission (FCC) regulates the output power of EM emanation in the United States. In addition to interference concerns, EM leakage can also be used as source material for side channel analysis techniques. The periodic nature of an un-dithered clock source allows for frequency spectrum which has predictable center frequencies and harmonics. An unauthorized observer can make use of the frequency and noise information via statistical means to gain access to confidential information about the operation of the electronic system.

SUMMARY

This disclosure describes devices and methods for generating spread spectrum clock signals that include true randomness.

In one example, a device includes spread spectrum clocking circuitry comprising delay circuitry configured to generate a random delay signal based on a random input value, and wherein the spread spectrum clocking circuitry is configured to generate a spread spectrum clock signal based on the random delay signal.

In another example, a method of generating a spread spectrum clock signal includes generating a clock signal; determining a random input value; generating a spread spectrum clock signal based on the clock signal and the random input value; and driving functional circuitry using the spread spectrum clock signal.

In another example, spread spectrum clocking circuitry includes clocking circuitry configured to generate a clock signal and delay circuitry configured to introduce random delay into the clock signal, based on a random input value, to produce a spread spectrum clock signal.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure describes techniques for spread spectrum clock generation circuitry. The spread spectrum clock generation circuitry of this disclosure may be constructed using a small number of digital electronic components compared to existing spread spectrum clock generation circuitry. As will be explained in more detail below, the designs described in this disclosure may utilize a tapped delay line, where a signal trace between each delay element is selected by a multiplexer. The delay elements, for example, may comprise buffers or may comprise two inverters connected in series. The circuit may be implemented in such a way that the multiplexor output is glitch free. A multiplexor select line is the sum of the previous registered value and a random input (e.g. a 6-bit random input), which rolls over upon saturation. As the value of the random input changes, the multiplexor selects different delay values, thereby dithering the rising edge of the output signal.

In some examples, the random value may be produced by a linear-feedback shift register (LFSR) which is reseeded periodically with a true random bit. The true random source randomly injects entropy into the system by setting the reseed signal, flipping a bit in the LFSR. and thereby moving it to a different point in its otherwise deterministic sequence.

A circuit implemented according to the techniques of this disclosure may be configured to modulate the output peak energy and lowers the EMI related to the fundamental frequency and harmonics, which lowers the total system EMI. Additionally, internal logic, driven off the dithered clock, may be temporally shifted in a non-deterministic manner. This can make statistical analysis techniques exceedingly difficult to perform because critical operations within an algorithm will occur at different times whenever the algorithm is performed.

Figure 1:
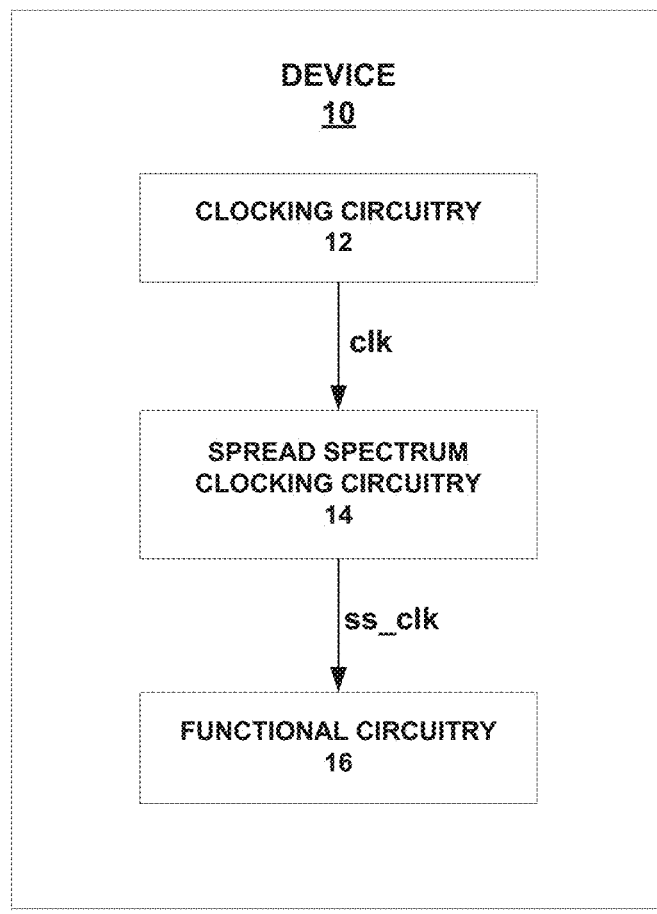
FIG. 1 is a block diagram illustrating an example device that may be configured to implement the techniques of this disclosure.

FIG. 1 shows an example of device 10, which is configured to implement the techniques of this disclosure. Device 10 includes clocking circuitry 12, spread spectrum clocking circuitry 14 (also referred to as SSC circuitry 14), and functional circuitry 16. Clocking circuitry 12 may include any type of clock generator configured to generate an oscillating signal. Clocking circuitry 12 generates clock signal clk, which may, for example, be a fixed-period clock signal, meaning clk oscillates between a high voltage and a low voltage at a period of a fixed duration. SSC circuitry 14 generates a spread spectrum clock signal (ss_clk) from clock signal clk. Clock signal ss_clk, by contrast, has a spread spectrum, meaning ss_clk oscillates between a high voltage and a low voltage at periods of non-fixed durations, and in fact, as will be described in more detail below, may oscillate between a high voltage and a low voltage at periods of truly random durations. Clock signal ss_clk coordinates the actions of functional circuitry 16, meaning transitions of logic levels within functional circuitry 16 occur coincident to clock edges of clock signal ss_clk. Although clocking circuitry 12 and SSC circuitry 14 are shown separately in FIG. 1 for purposes of illustration and explanation, when implemented, clocking circuitry 12 and SSC circuitry 14 may, in fact, be highly integrated.

As will be explained in more detail below, ss_clk may be a non-deterministic clock signal. In other words, a period of clock signal ss_clk may change in a random manner. By driving functional circuitry 16 off of non-deterministic clock signal ss_clk, device 10 may generate less narrow band emanation (i.e. noise) compared to devices using other clocking schemes. Additionally, the narrow band emanation of device 10 may have a non-deterministic noise profile, thus potentially improving the confidentiality of operations of device 10.

Device 10 of FIG. 1 may represent any one of a large variety of device types. Device 10 may, for example, be any type of general purpose computer ranging from a small handheld device such as a tablet or smartphone up to a larger device such as a server. Device 10 may also represent any type of special purpose computer, such as navigation systems, encrypted communication systems, identity authentication systems, financial transaction system, or the like. While not limited to any particular type of device, the techniques of this disclosure may be particularly beneficial to devices that may be the target of attackers trying to extract sensitive information. In a system with a fixed clock signal or a deterministic spread spectrum clock signal, an attacker can determine the clock signal used by the device. By knowing the clock signal, the attacker can determine a duty cycle for the device, determine how many signals are switching at any given point in time during the clock cycle, and utilize other analytic tools to model the behavior of the device. With a more accurate model of the behavior of the device, an attacker can more easily extract or intercept information from the device, jam the device, or otherwise compromise the device.

Functional circuitry 16 of device 10 may implement the functionality of device 10. Functional circuitry 16 may, for example, include synchronous digital logic circuitry that is synchronized by clock signal ss_clk. Functional circuitry 16 may comprise any of a wide variety of circuitry, depending on the application of device 10. Functional circuitry 16 may, for example, include one or more general purpose processors and/or special purpose processors. Functional circuitry 16 of device 10 may be implemented, at least in part, in hardware, software, firmware or any combination thereof. For example, functional circuitry 16 may be implemented using one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. Moreover, functional circuitry 16 may include one or memory components, such as random access memory (RAM), read only memory (ROM), non-volatile RAM (NVRAM), electrically erasable programmable ROM (EEPROM), flash memory, magnetic data storage media, optical data storage media, or the like.

As will be explained in greater detail below, spread spectrum clocking circuitry 14 may be configured to drive functional circuitry 16 with a spread spectrum clock signal (ss_clk). Spread spectrum clocking circuitry 14 may be configured to include delay circuitry configured to generate a random delay signal based on a. random input value and generate ss_clk based on the random delay signal. By introducing true randomness into the delay signal, spread spectrum clocking signal may be able to generate a truly random, as opposed to a merely pseudo random, clock signal.

Figure 2:
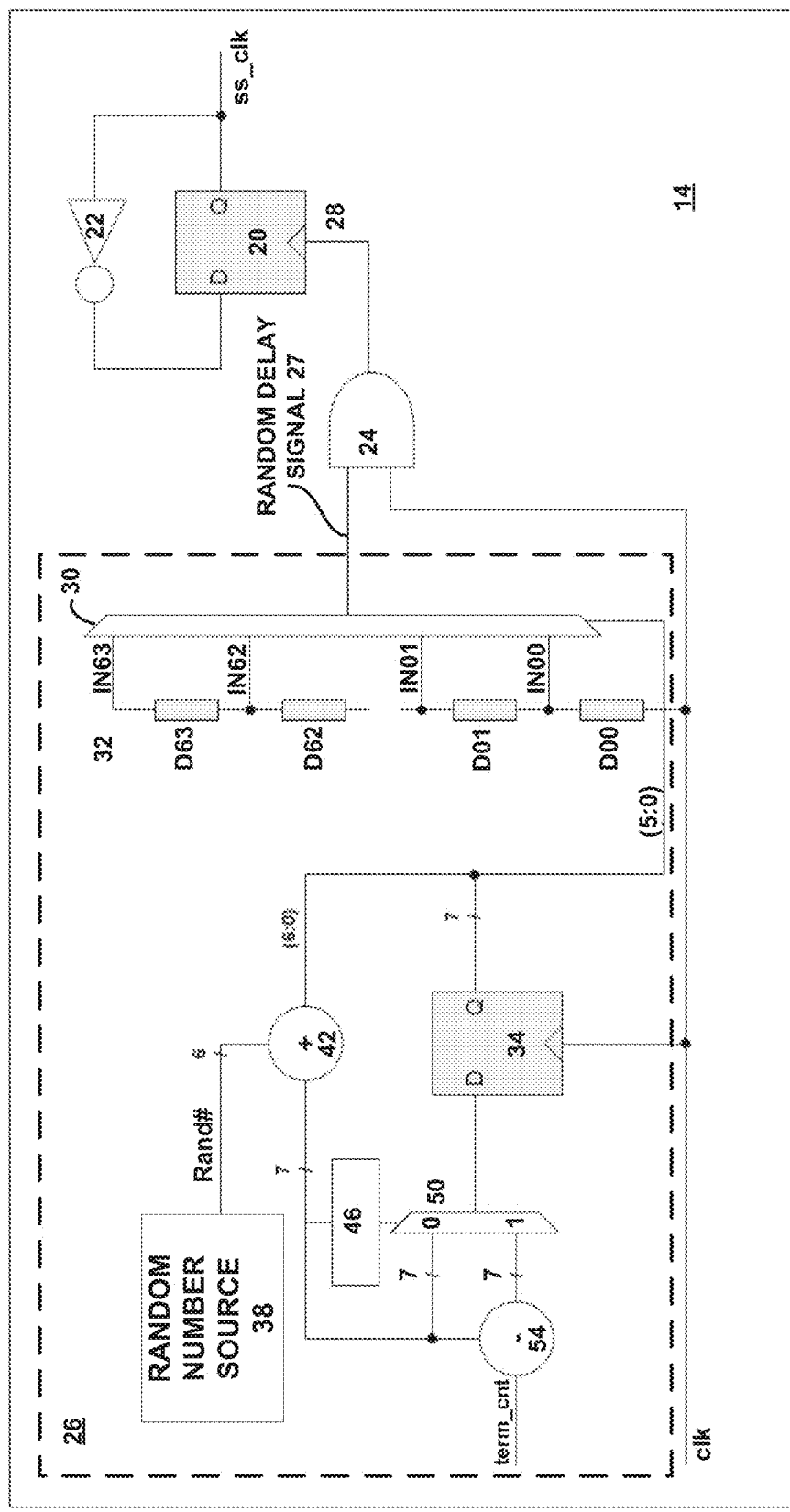
FIG. 2 is a circuit diagram showing an example implementation of spread spectrum clock generation circuitry in accordance with the techniques of this disclosure.

FIG. 2 is a circuit diagram showing a. more detailed view of SSC circuitry 14. SSC circuitry 14 receives a fixed frequency clock signal (clk) from clocking circuitry 12 and outputs spread spectrum clock signal (ss_clk). SSC circuitry 14 includes D-flip flop 20, inverter 22, AND gate 24, and delay circuitry 26. Delay circuitry 26 includes multiplexer 30, delay line 32, D-flip flop 34, random number source, 38, summer 42, comparison logic 46, multiplexer 50, and subtractor 54.

Output Q of D-flip flop 20 corresponds to spread spectrum clock signal ss_clk, which may, for example, be used to drive functional circuitry 16 of FIG. 1. Output Q of D-flip flop 20 is also fed back to input D of D-flip flop 20 through inverter 22. Inverter 22 outputs a logic high signal in response to receiving a logic low input and outputs a logic low signal in response to receiving a logic high input signal. Thus, when output Q of D-flip flop 20 is high, input D of D-flip flop 20 will be low, and when output Q of D-flip flop 20 is low, input D of D-flip flop 20 will be high. At a specific time, such as a rising clock edge, input D of D-flip flop 20 is transferred to output Q of D-flip flop 20. The timing of this transfer is controlled by input 28 of D-flip flop 20. For example, D-flip flop 20 may be configured to transition input D to output Q on a rising clock edge, i.e. when the value at input 28 changes from a logic low to a logic high. As will be explained in greater detail below, delay circuitry 26 introduces randomness into the value of input 28, thus introducing randomness into the timing of the high-low and low-high transitions of ss_clk.

Input 28 of D-flip flop 20 corresponds to the output of AND gate 24. Thus, the output of AND gate 24 controls D-flip flop 20, and consequently, controls when ss_clk transitions from low to high and high to low. The inputs to AND gate 24 are clock signal clk and the output of delay circuitry 26. The output of delay circuitry 26 may be referred to in this disclosure as random delay signal 27. As will be explained in more detail below, random delay signal 27 output by delay circuitry 26 controls when ss_clk undergoes a state transition (i.e. a high-low transition or a low-high transition), and because random delay signal 27 includes randomness, it introduces randomness into the state transitions of ss_clk.

AND gate 24 outputs a logic high in response to both inputs being high and outputs a logic low in response to one or both inputs being low. As will be explained in more detail below, delay circuitry 26 is configured to generate random delay signal 27 based on a random input value. Random delay signal 27 is input to AND gate 24 with clk. Therefore, the state transitions of ss_clk are based on random delay signal 27, making the frequency of those transitions also random.

In the example of FIG. 2, output Q of D-flip flop 34 is a 7-bit output. In this example, the six least significant bits (i.e. bits 5:0) of the 7-bit output are input to multiplexer 30 and cause multiplexer 30 to select a delay path from delay line 32 to be output. Delay line 32 includes sixty-four delay elements, with different combinations of the delay elements forming different delay paths. The number of delay elements and the delays of each individual delay element may be selected such that a maximum total delay of delay line 32 is at most one-half of the period of clk. The delay elements are labeled D00, D01, D62, and D63 in FIG. 2. For simplicity and ease of illustration, FIG. 2 does not show all sixty-four delay elements.

Multiplexer 30 includes sixty-four inputs, labeled IN00, IN01, IN63, and IN64. Again for simplicity, not all sixty-four inputs are shown in FIG. 2. Based on bits 0 through 5 of the output of D-flip flop 34, multiplexer 30 outputs one of inputs 0 through 63. Delay elements D00-D63 add delay to clock signal clk. In the example of FIG. 2, IN01 corresponds to clock signal clk as delayed by delay element D00. IN01 corresponds to clock signal clk as delayed by delay elements D00 and D01. IN02 corresponds to clock signal clk as delayed by delay elements D00, D01, and D02 (not explicitly shown in FIG. 2); and so forth through IN63 which corresponds to clock signal clk as delayed by delay elements D00 through D63. Delay elements D00-D63 may, for example, be implemented as buffer elements, two or more inverters connected in series, or some other such configuration.

The output of multiplexer 30, which corresponds to one of inputs IN00 through IN063, is input into AND gate 24 with clock signal CLK. If both the output of multiplexer 30 and clk are high, then AND gate 24 outputs a logic high, causing ss_clk to transition from high to low or low to high. If one or both of the output of multiplexer 30 and clk are low, then AND gate 24 outputs a logic low, in which case ss_clk does not transition from high to low or low to high.

Random number source 38 generates a 6-bit random number (Rand#), and summer 42 adds the 7-bit output of multiplexer 34 to the 6-bit random number to generate a new 7-bit value. The new 7-bit value is compared by comparison logic 46 to a terminal count value (term_cnt). If the new 7-bit value is greater than the terminal count value, then comparison logic 46 outputs a 1, causing multiplexer 50 to output the new 7-bit value minus the terminal count value. If the new 7-bit value is not greater than the terminal count value, then comparison logic 46 outputs a 0, causing multiplexer 50 to output the new 7-bit value. The output of multiplexer 50 is captured by D-flip flop 34 at input D and is transferred to output Q at rising clock edges of clk.

D-flip flop 34 outputs a new 7-bit value at output Q on every rising edge of clk, and this new 7-bit output causes multiplexer 30 to select a new delay path through delay line 32 on every rising edge of clk. As the 7-bit value output by D-flip flop 34 changes randomly from one time instance to the next, the selected input of multiplexer 30 also changes randomly from one time instance to the next, which introduces the randomness into random delay signal 27 generated by delay circuitry 26. As transitions at D-flip flop 20 are caused by rising edges transitions at input 28 and because input 28 is a function (the out of AND gate 24) of clk and random delay signal 27, the transitions of ss_clk are random.

Figure 3:
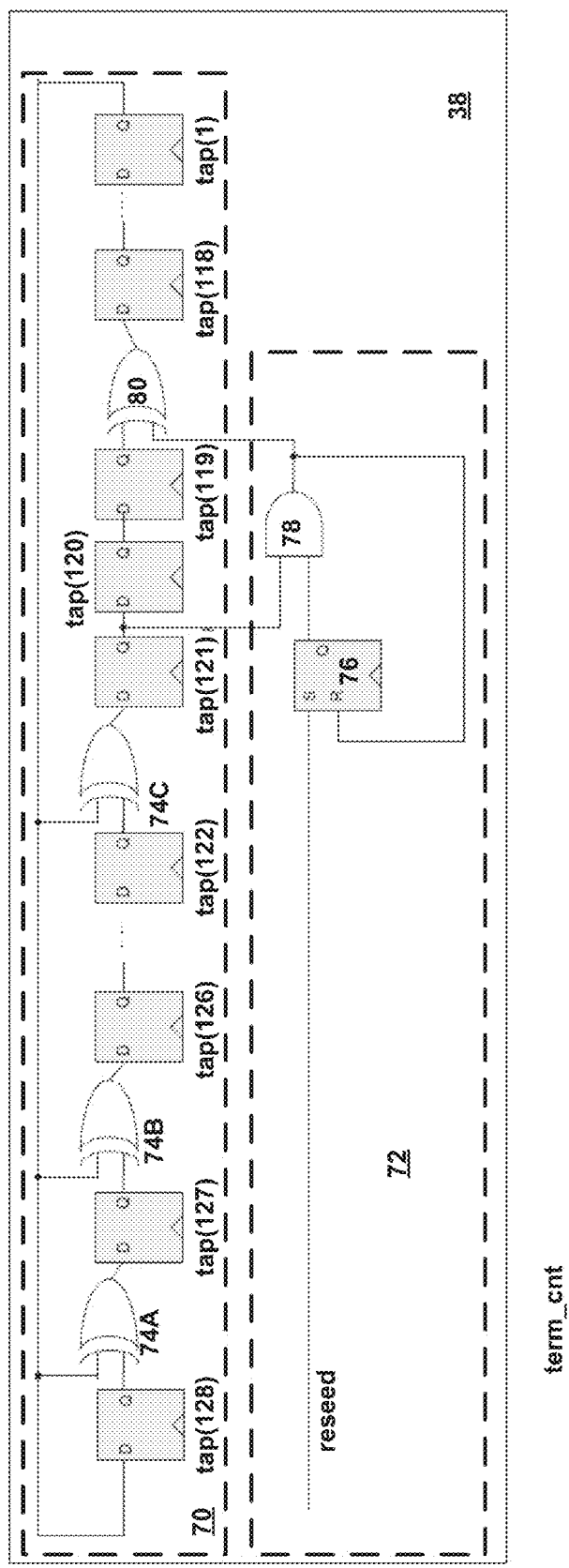
FIG. 3 is a circuit diagram showing an example implementation of a random number source that may be used in accordance with the techniques of this disclosure.

FIG. 3 is a circuit diagram showing one example implementation of random number source 38 of FIG. 2. In the example of FIG. 3, random number source 38 includes an LFSR portion (LFSR 70) and a reseed portion (reseeder 72). LFSR 70 includes a plurality of D-latches (labeled tap(128) through tap(1) in FIG. 3) and a plurality of XOR gates 74A-74C. Each latch has an output (labeled Q in FIG. 3). The XOR gates define a feedback path that causes the 128-bit output (i.e. the Q values at taps 1-128) to move through a pseudo random sequence. In the example of FIG. 3, XOR gates 74A-74C are arranged in a maximal length configuration to maximize the number of 128-bit outputs LFSR 70 sequences through before repeating the sequence. It should be understood that numerous other configurations of LFSRs, including non-maximal length LFSR configurations, may be utilized in conjunction with the techniques of this disclosure. Additionally, LFSR 70 as shown in FIG. 3 is a 128-bit LFSR but LFSRs of other bit depths may also be used.

The 6-bit random output of random number source 38 can be the outputs (e.g. the Qs) of any six of the latches of taps 1 through 128. Referring back to FIG. 2, in some implementations, random number source 38 may be connected to summer 42 through a multiplexor such that which six D-latch outputs are used as the random number changes over time, thus introducing additional pseudo-randomness into random number source 38.

In the illustrated example of FIG. 3, random number source 38 also includes reseeder 72, which is configured to inject true randomness into LFSR70. Reseeder 72 injects the true randomness into LFSR 70 by randomly changing 1 of the 128 bits on taps 1-128. In the example, of FIG. 3, reseeder 72 randomly changes the bit on the output of tap 119, although other bits could also be changed. Reseeder 72 includes set-reset flip flop 76, AND gate 78, and XOR gate 80. Set-reset flip flop 76 is configured to receive a truly random value. This truly random value may be generated by a hardware-based random value generator. Examples of such hardware-based random value generators include ring oscillator-based random value generators and radioactive decay or other quantum mechanical-based random value generators configured to produce a randomly changing 1-bit value. The techniques of this disclosure, however, are not dependent on any particular type of random value generator.

Reseeder 72 may also include logic configured to prevent LFSR 70 from entering into an all-zero state, at which point LFSR 70 may stop sequencing through values. The reseed value is received at set-reset flip-flop 76. On set-reset flip-flop 76, when S and R inputs are both low, set-reset flip-flop maintains the Q output in a constant state. If S is pulsed high while R is held low, then the Q output is forced high, and stays high when S returns to low. Similarly, if R is pulsed high while S is held low, then the Q output is forced low, and stays low when R returns to low. The output Q of set-reset flip-flop 76 is sent to AND gate 78, with the output of tap 121. The output of AND gate 78 is input to XOR gate 80 with the output of tap 119. Thus, when the output of AND gate 78 is high and the output of tap 119 is low, then XOR gate 80 "flips" the low output of tap 119 from low to high. Similarly, when the output of AND gate 78 is low and the output of tap 119 is high, then XOR gate 80 "flips" the high output of tap 119 from high to low. This flipping of the output of tap 119 based on a random reseed value introduces true randomness into the output of LFSR 70.

As the output of AND gate 78 is only true when both inputs of AND gate 78 are true, AND gate 78 will only have a true value (i.e. a value of 1), when the output of tap 121 is also high. Thus, the output of tap 119 is only flipped when the output at tap 121 is a 1, which prevents reseeder 72 from causing LFSR 70 to enter an all zero state, at which point LFSR 70 may stop propagating through the random sequence.

Although FIGS. 2 and 3 have been described giving a configurations with exact bit depths and an exact number of delay elements, it should be understood that this described configuration constitutes only one of many possible configurations in accordance with the techniques of this disclosure. The techniques described are not limited to any particular set of bitdepths or any particular number of delay elements and may be implemented using either larger or smaller bitdepths as well as using either more or fewer delay elements. Moreover, this disclosure has shown several examples of circuit logic that may be used to implement the techniques of this disclosure, but it should also be understood that alternative logic arrangements may also be utilized.

Figure 4:
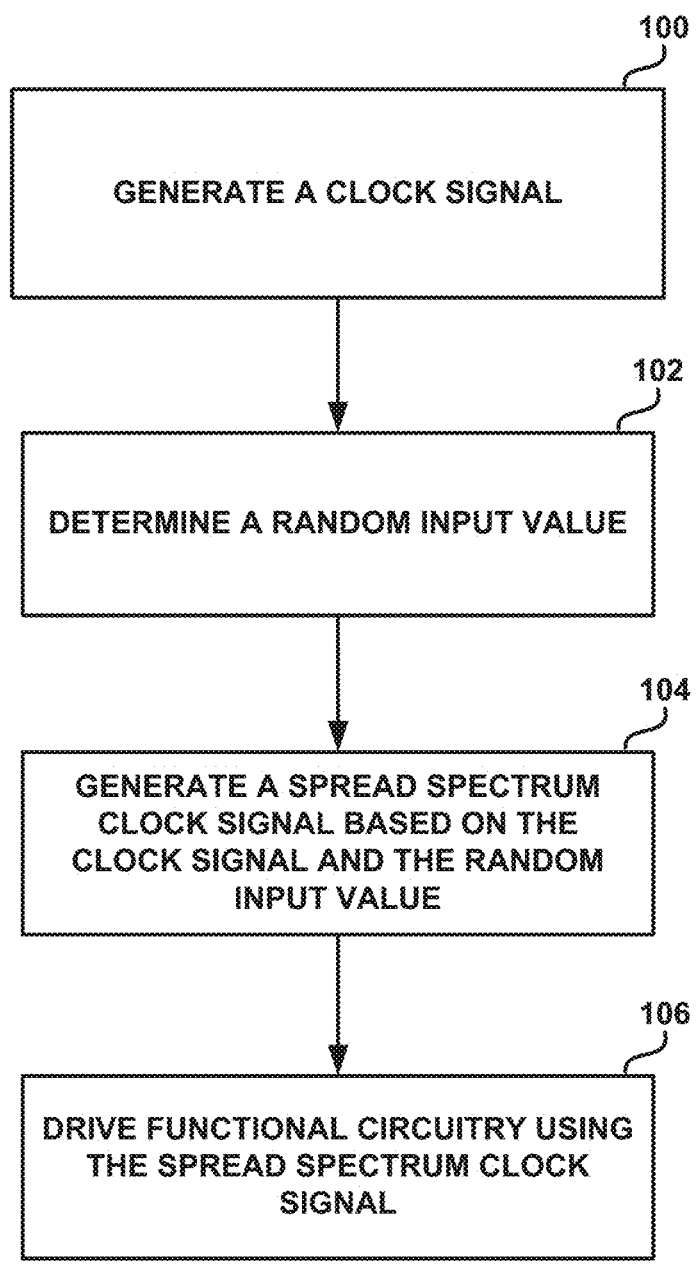
FIG. 4 is a flowchart illustrating a method of generating a spread spectrum clock signal in accordance with the techniques of this disclosure.

FIG. 4 is a flowchart showing an example method for generating a spread spectrum clock signal according to the techniques of this disclosure. FIG. 4 will be described with reference to generic spread spectrum clock generation circuitry, which may, for example, include some or all of the circuitry described in FIGS. 1-3. The spread spectrum clock generation circuitry generates a clock signal (100). The spread spectrum clock generation circuitry determines a random input value (102) and generates a spread spectrum clock signal based on the clock signal and the random input value (104). The spread spectrum clock generation circuitry drives functional circuitry using the spread spectrum clock signal (106). To generate the spread spectrum clock signal based on the clock signal and the random input value, the spread spectrum clock generation circuitry may, based on the random input value, select a delay path from a delay line comprising one or more delay elements and control a state transition of the spread spectrum clock signal using an output of the selected delay path. To determine the random input value, the spread spectrum clock generation circuitry may determine a reseed value and flipping a bit of a linear feedback shift register based on the reseed value.

The techniques of this disclosure may be implemented in a wide variety of computer devices including as part of an integrated circuit (IC) or a set of ICs (e.g., a chip set). Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

Various examples have been described. These and other examples are within the scope of the following claims.

The invention claimed is:

1. A device comprising:
a clock signal generator configured to generate a clock signal;
a delay line comprising one or more delay elements, wherein the one or more delay elements are configured to add delay to the clock signal;
a multiplexer configured to output a random delay signal, wherein an amount of delay of the random delay signal corresponds to a number of the one or more delay elements selected by the multiplexer and wherein the number of the one or more delay elements selected by the multiplexer is based on a random input value; and
spread spectrum clocking circuitry configured to generate a spread spectrum clock signal based on the random delay signal.

2. The device of claim 1, wherein the one or more delay elements comprise one or more buffers.

3. The device of claim 1, wherein the one or more delay elements comprise 2N inverters connected in series, wherein N is an integer greater than one.

4. The device of claim 1, further comprising a random number source configured to generate the random input value.

5. The device of claim 4, wherein the random number source comprises a linear feedback shift register (LFSR).

6. The device of claim 5, wherein the random number source further comprises an input to receive a reseed value, and wherein the random number source is further configured to flip a bit in the LFSR in response to receiving the reseed value.

7. The device of claim 6, wherein the random number source further comprises circuitry to prevent an output of the LFSR from being all zeros.

8. The device of claim 5, further comprising:
a second multiplexer configured to select an output of the LFSR as the random input value.

9. The device of claim 1, further comprising a D-flip flop configured to produce an output corresponding to the spread spectrum clock signal, wherein a state of the output of the D-flip flop transitions based on a value the random delay signal.

10. The device of claim 1, further comprising:
functional circuitry, wherein the spread spectrum clocking circuitry is configured to drive the functional circuitry.

11. A method of clocking circuitry, the method comprising:
generating a clock signal;
determining a random input value;
based on the random input value, selecting a delay path from a delay line comprising one or more delay elements; and
generating a spread spectrum clock signal based on the clock signal and the random input value, wherein a state transition of the spread spectrum clock signal is dependent on an output of the selected delay path; and
driving functional circuitry using the spread spectrum clock signal.

12. The method of claim 11, wherein a delay element of the one or more delay elements comprises a buffer.

13. The method of claim 11, wherein a delay element of the one or more delay elements comprises two or more inverters connected in series.

14. The method of claim 11, wherein determining the random input value comprises:
determining a reseed value;
flipping a bit of a linear feedback shift register based on the reseed value.

15. Spread spectrum clocking circuitry comprising:
clocking circuitry configured to generate a clock signal; and
delay circuitry configured to introduce random delay into the clock signal, based on a random input value, to produce a spread spectrum clock signal, wherein the delay circuitry is configured to select a delay path from a delay line comprising one or more delay elements based on the random input value and control a state transition of the spread spectrum clock signal based on an output of the selected delay path.

16. The spread spectrum clocking circuitry of claim 15, wherein the delay circuitry comprises a linear feedback shift register (LFSR).

17. The spread spectrum clocking circuitry of claim 16, wherein the delay circuitry further comprises reseeding circuitry configured to receive a random input value and to flip a bit in the LFSR based on the random value.

18. The spread spectrum clocking circuitry of claim 16, further comprising:
circuitry to prevent an output of the LFSR from being all zeros.

* * * * *